E. A. HAILWOOD.
APPARATUS FOR IGNITING MINERS' SAFETY LAMPS.
APPLICATION FILED JAN. 27, 1909.
946,670.
Patented Jan. 18, 1910.
3 SHEETS—SHEET 1.
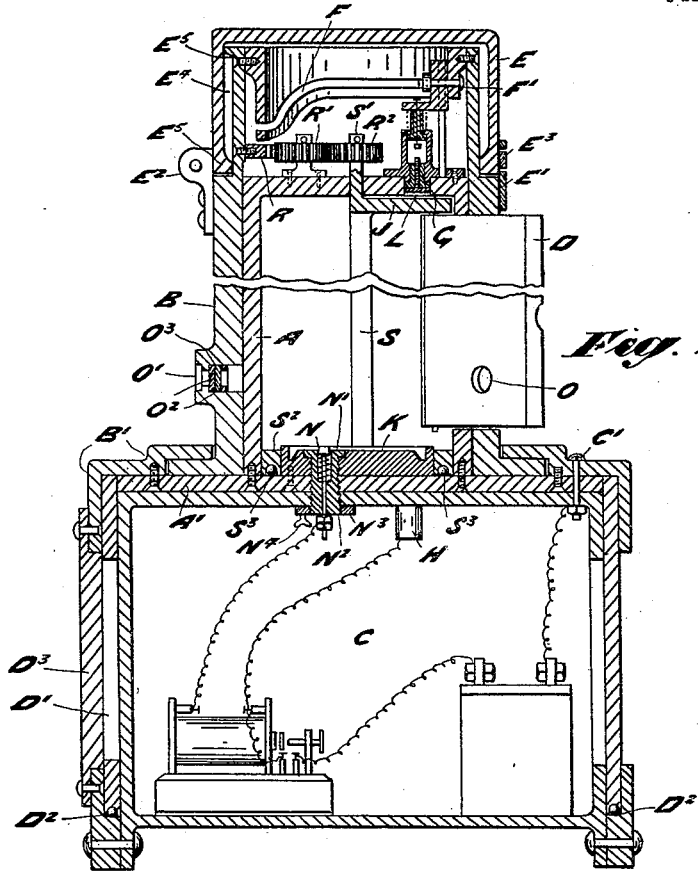
Fig. 1.
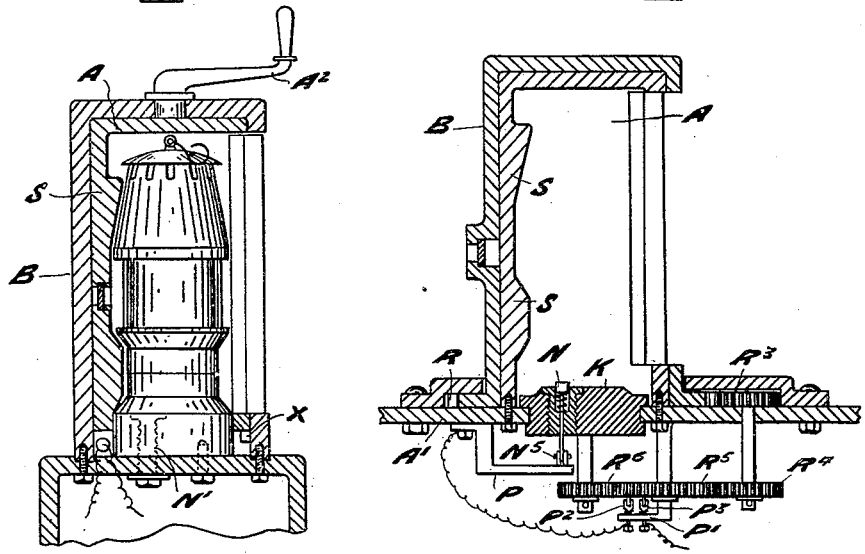
Fig. 2.    Fig. 3.    INVENTOR
Ernest Arthur Hailwood
WITNESSES E. A. HAILWOOD.
APPARATUS FOR IGNITING MINERS' SAFETY LAMPS.
APPLICATION FILED JAN. 27, 1909.
946,670.
Patented Jan. 18, 1910.
3 SHEETS—SHEET 2.
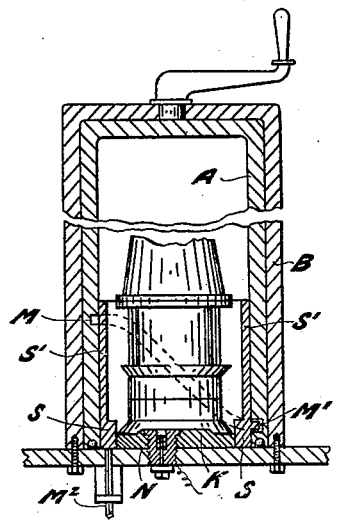
Fig. 4.
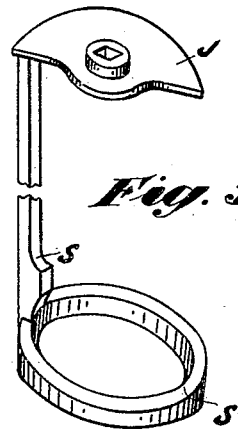
Fig. 5.
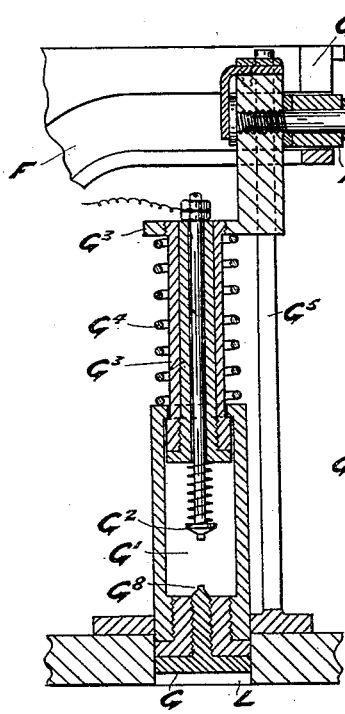
Fig. 6.
Fig. 2a.
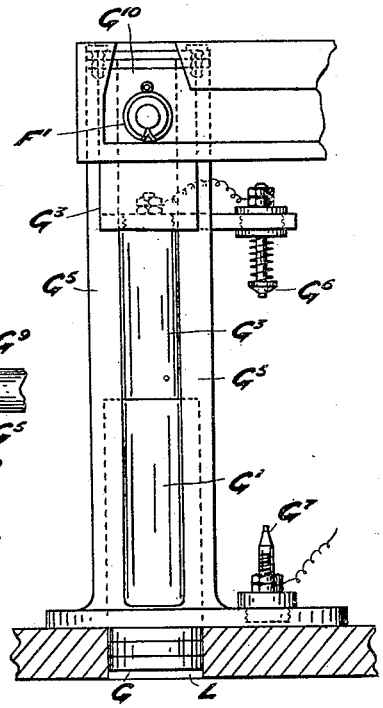
Fig. 7.
WITNESSES
W. P. Burk
A. F. Heuman
INVENTOR
Ernest Arthur Hailwood
BY E. A. HAILWOOD.
APPARATUS FOR IGNITING MINERS' SAFETY LAMPS.
APPLICATION FILED JAN. 27, 1909.

946,670.

Patented Jan. 18, 1910.

3 SHEETS—SHEET 3.

WITNESSES
W. P. Burke
A. F. Heuman

INVENTOR
Ernest Arthur Hailwood

UNITED STATES PATENT OFFICE.

ERNEST ARTHUR HAILWOOD, OF MORLEY, NEAR LEEDS, ENGLAND.

APPARATUS FOR IGNITING MINERS' SAFETY-LAMPS.

946,670.  Specification of Letters Patent.  Patented Jan. 18, 1910.

Application filed January 27, 1909. Serial No. 474,612.

*To all whom it may concern:*

Be it known that I, ERNEST ARTHUR HAILWOOD, a subject of the King of Great Britain and Ireland, whose postal address is 7 Gladstone Terrace, Morley, near Leeds, in the county of York, England, have invented certain new and useful Improvements in or Relating to Apparatus for Igniting Miners' Safety-Lamps, of which the following is a specification.

My invention has reference to improvements in or relating to apparatus for igniting miners' safety lamps, or the like, especially suitable for use in the underground workings of mines and in like places, of the type described in my British specifications No. 21009 of 1905, and No. 25258 of 1906, and has for its primary object, the arrangement and construction of a device whereby a lamp in the lamp chamber may be automatically freed from any obstructions or tampering devices which may be placed on or near the same, or to displace a lamp carrying such tampering devices, by means of what may be termed a sweep operating around or about the lamp, either horizontally or vertically, or by means of moving the lamp within or against the sweep, the secondary object being the arrangement and construction of lamp igniting apparatus or devices, and details of same.

Figure 8:
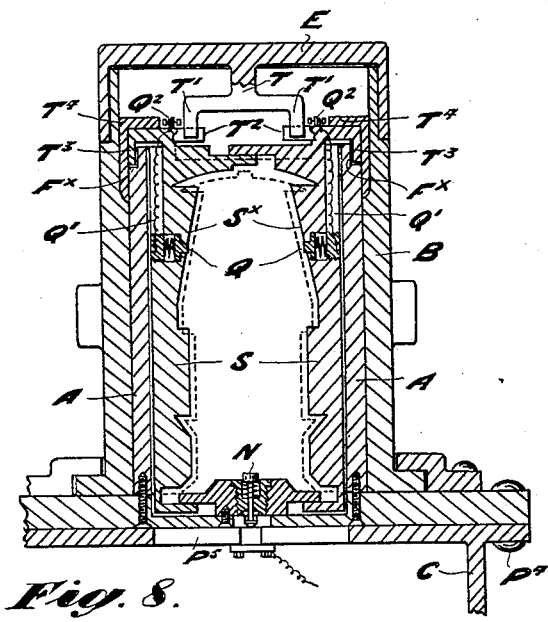
Figure 11:
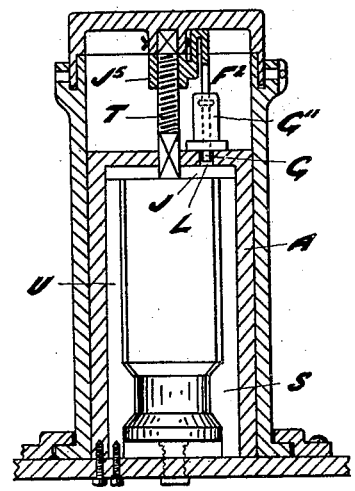
Figures 9, 10A:
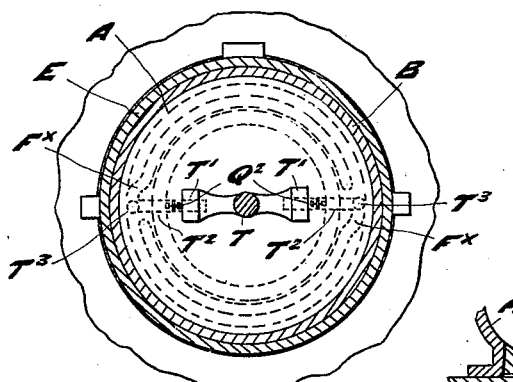
Figure 12:
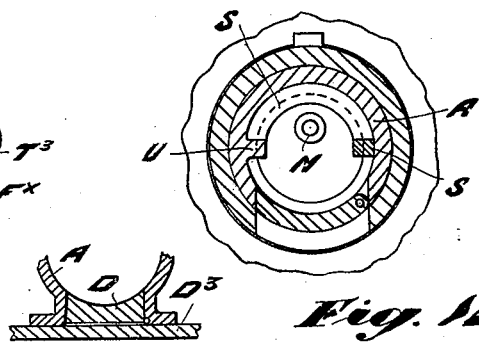
Figure 10:
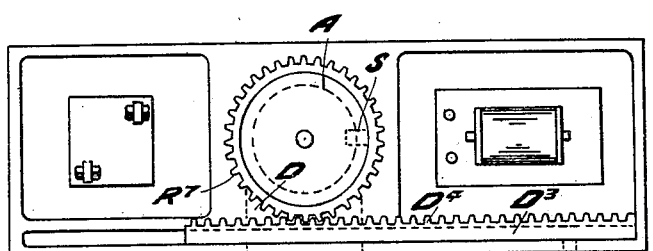

In describing my invention in detail, reference is made to the accompanying sheets of drawings, similar letters, where possible, indicating similar parts, in which, Figure 1 represents a sectional elevation of a lamp igniting device illustrating the form of my improvement. Fig. 2 represents another form. Fig. 3 represents a form in which the lamp and base plate are caused to revolve in a chamber provided with a fixed sweep. Fig. 4 represents a form showing a rising and falling sweep. Fig. 5 represents a detail of the sweep shown in Fig. 1. Figs. 6, 7, and 7ᵃ, represent details of the switch shown in Fig. 1, and hereinafter described. Figs. 8 and 9 represent sectional elevation and plan of a modified form of apparatus. Fig. 10 represents a further modification. Fig. 10ᵃ represents a detail of Fig. 10. Figs. 11 and 12 represent sectional elevation and plan showing another form.

In carrying my invention into effect, I employ in any suitable lamp chamber A, revolving, sliding, or otherwise moving "shaped" or unshaped plates, rods, disks, or the like, arranged to form what may be termed a sweep or sweeps S, such sweep or the like being suitably operated in connection with revolving, sliding, or otherwise moving portion of the device, such as the door or chamber B, or in connection with the means for operating said door or chamber, though in some cases I find it desirable to keep the sweep or like stationary, and to move the lamp within same by similar means, the devices being arranged in a manner as to sweep away or disturb any substance or substances other than the miner's safety lamp placed within the device.

It will be obvious to those skilled in the art, that in order to construct a complete apparatus it is advisable to arrange the sweep or the like to operate in conjunction with electric switches, contacts, guards, and the like, and I have shown same so constructed, but it must be understood the details of constructions hereinafter described and illustrated may be departed from without in any way departing from the principle of my invention, and that other electrical devices, guards, and switches, and sweep operating devices, may be used than those hereinafter described.

With reference to Fig. 1, A is the lamp chamber provided with a pivoted door D provided with inspection opening O, (closed by glass or the like), B is the outer chamber provided with inspection means $O^1$, comprising two glasses $O^2$ with gauze $O^3$ between same. The chamber A is carried on frame $A^1$ which also serves to carry flange $B^1$, to form guides in which chamber B may revolve. The chamber C containing the necessary source of electrical energy, is fastened to frame $A^1$ and flange $B^1$ by means of bolts $C^1$. The chamber C is provided with a door $D^1$ mounted on balls $D^2$ to reduce friction. To make the path of escaping exploded gases more tortuous, a semi-circular plate $D^3$ is fixed to the apparatus to cover the opening in door $D^1$ when in the closed position as shown. The chamber B is provided with a cap or cover E, and retained thereon by means of brackets $E^1$, $E^2$, and stop or stops $E^3$, (the bracket $E^1$ and stop $E^3$ forming, as it were, a bayonet joint). One of the brackets $E^2$ is attached to the chamber B, and another to cap E, and a bolt and lock may secure same. The upper part of chamber B is recessed for the reception of the cover E, and arranged so that a space or gap $E^4$ may be left for purposes of releasing gas or like pressure, the metal being cut away for this purpose, so as to leave touch pieces $E^5$ to prevent shaking and rattling of the cap. As a further means of relief, a spiral tube may be arranged in the apparatus, one end being open to the inside of the chamber, while the other end is open to the outside, so that the hot gases in passing along the tube would be relieved of pressure and heat. In the upper part of the chamber is provided a cam path F, in which works a roller $F^1$ connected to switch mechanism G hereinafter described. A rack R is provided in chamber B which engages with pinion $R^1$, same in turn engaging pinion $R^2$ which is mounted on stud $S^1$ of the sweep S, such stud passing through crown of chamber A. A guard J is formed on the sweep S, in order to protect the contact mechanism when the door is open; such sweep may be in the shape of a plain bar, or to somewhat the configuration of the outer shape of the lamp, and the said sweep may terminate in a ring $S^2$ which surrounds the base or lamp ring K, this ring being, by preference, mounted on balls $S^3$. The door D being hinged, or pivoted, and in configuration a segment of a circle, the slight movement of the outer chamber B will close same. The ring K is provided with a contact N of any ordinary construction, or the contact N may be mounted on an insulated screwed bush $N^1$, provided with a squared end $N^2$ on which a ring $N^3$ may be placed, and fastened to the chamber C by means of nut or screw $N^4$. A tube H conducts the wire or wires to the contact or switch mechanism G. The guard J protects, when the door D is open an aperture L through which the switch mechanism G may make contact with the lamp at the desired time.

The lamp is placed in the chamber A, the outer chamber revolved, causing the gearing to operate the sweep around the lamp, the gearing being, by preference, arranged to cause the sweep to make more than one complete circle of the lamp (such as one turn and a fraction of a turn), during the turning of chamber B, through say half a revolution. The guard moves away from the aperture L, and the cam causes the switch mechanism to operate on to the lamp. The arrangement of wiring shown will be understood by those skilled in the art. Suitable buffer springs or stops may be arranged to prevent the chamber B being moved too far in one direction or another, and which stops may for convenience be mounted in a casing attached to the upper face of flanged ring $B^1$.

Fig. 2 shows a form of construction in which the chamber A is revolved by some suitable means, such as handle $A^2$, and the sweep S formed to the configuration of the lamp, is attached to or forms part of chamber A. Chambers A and B are provided with lamp admittance openings, and when the inner chamber has been revolved, thereby closing the lamp admittance openings, the sweep will pass around the lamp, and so remove any obstructions in manner aforesaid. The sweep may comprise a narrow strip or may surround half the periphery of the lamp. In Fig. 2, I have shown the electric circuit as being closed by a projection X, on foot of revoluble inner lamp chamber, coming into contact with the electric push attached to the fixed frame of the machine.

In the form shown in Fig. 3, the lamp chamber A is stationary, and the outer chamber B is revolved, the sweep S being formed in the inner chamber A. The chamber B carries a circular rack R, and as same revolves will operate a pinion $R^3$ which carries another pinion $R^4$, operating a pinion $R^5$, which in turn operates a pinion $R^6$. Mounted on a movable lamp ring K, the contact N carries a roller end $N^5$ which will, at the desired time, engage with an insulated contact piece on plate P, mounted on frame $A^1$, or any other suitable portion of the apparatus. Mounted on the apparatus in any suitable manner, such as the bearing of pinion $R^5$ is carried a bracket $P^1$ carrying roller contacts $P^2$, $P^3$, which at the desired time will be bridged by a contact piece on pinion $R^5$. Thus, as the lamp is inclosed in its chamber and the door or chamber B is revolved, the movable lamp ring K will cause the lamp to be revolved, and the fixed sweep S will remove obstruction as same comes in contact.

Fig. 4 shows a further form of device, wherein a movable chamber A carries a curved and rising path M of any suitable height, with which engages a stud or studs $M^1$ attached to sweep S, which in this case is in the form of a ring. A square guide bar $M^2$ prevents the ring S from turning, and the path M is guarded by a semi-circular guard $S^1$ attached to sweep S. As the chamber B is revolved, the sweep S rises and tends to remove any obstruction, or should same tend to jam against the lamp, same will be raised from its ring K and thus from the contact N, thereby preventing the lamp from being lighted. As the chamber is opened, the ring or sweep will descend. The sweep, in addition to being constructed to rise and fall, may be revolved somewhat.

Fig. 5 shows an isometric view of the combined sweep and guard plate, shown and described with reference to Fig. 1, from which the construction will be plain.

Figs. 6, 7, and $7^a$, represent details of the switch mechanism G before referred to, wherein G represents an insulated push piece mounted in a sleeve $G^1$, into which projects an insulated spring contact $G^2$ attached to a bracket G³, a spring G⁴ holding the sleeve G¹ in its lower or outer position. The bracket G³ carries the cam roller F¹, and such bracket works in a slide G⁵, as shown in Figs. 6 and 7. A further insulated spring contact G⁶ is carried on bracket G³, and when the cam is pressed to its lowest point, contact G⁶ will make contact with an insulated spring contact G⁷ fixed preferably on the crown of chamber A, or the base plate of slide G⁵, and in the instance shown, connected by a wire leading down tube H, Fig. 1, to secondary and primary circuits. The contact G will pass through aperture L, and the guard J having moved aside will allow the said contact to make contact with the lamp. As the cam reaches the downward end of its travel, contacts G² and G⁸ will meet, the spring on contact G² allowing for adjustment and for varying sizes of lamps, and also for this purpose, contacts G⁶ and G⁷ may be provided with a spring or springs. Contacts G⁶ and G² are connected together by a flexible conductor. In order to steady the bracket G³ in its slide bars G⁵, the said bracket is provided with guide cheeks G⁹, somewhat as shown in Fig. 7ᵃ. To admit of rapid abstraction and reinsertion of the push and bracket G³, a gap G¹⁰ is formed from the cam path through the top part of the cam casting, and through this gap the push and bracket may be passed when the outer chamber and cam have been moved into a suitable position. I do not confine myself to this contact device alone, and I may use any other suitable devices, the example shown being found satisfactory.

In place of constructing the sweep S in one piece, I may construct same of two or more pieces, and cause contacts placed in the sweep members to be operated by the lamp, an example is shown in Fig. 8, and Fig. 9, in which the operation of chamber or door B, imparts the desired movement to the sweeps. The cap or cover E which moves with the chamber B carries a bar T on which are mounted jaws T¹ arranged to convey motion to lugs T² slidably mounted in jaws T¹, said lugs T² being connected to sweeps S, formed substantially to the configuration of a lamp side, as shown. A portion T³ of lugs T² runs in a cam path Fˣ formed in chamber A, in such a manner that when the apparatus is open, the sweeps S are forced apart to allow of the insertion and removal of the lamp. To allow of this opening of the sweeps, recesses with sloping sides may be formed in the walls of the lamp chamber. As the door or chamber is closed, the lugs, and therefore the sweeps move inward till the latter almost touch the lamp and sweep around or about the same. About the completion of the closing movement, the lugs, T², traveling under ring projections T⁴ will be forced down slightly by means of a dip in such projections, causing the contracted portions Sˣ of the sweeps in which are mounted suitable electrical pushes Q, to be pressed hard on to the lamp, and thereby close the pushes and complete that portion of the circuit, through wires Q¹ connected to spring contact pieces Q², connected in any suitable manner in the electric circuit, such as by being pressed against the ring projections T⁴, said pieces Q² being arranged that same will only engage insulated contact pieces on projections T⁴ when the lamp chamber is completely closed. The final position of the sweep is shown by dotted lines in Fig. 8. The abutting edges of the sweep portions would be overlapped, and the upper faces of the sweep broadened somewhat, so as to protect the apertures in which the various parts operate.

In the drawing, the upper portion of the apparatus is shown pivoted at P⁴, in such a manner that same may be swung clear for the purpose of obtaining access to the chamber C through aperture P⁵, the contact N in this form being preferably formed of two portions, the upper spring portion being carried by the lamp chamber while the lower fixed one is attached to a bracket on chamber C.

Fig. 10 shows a rectangular form of apparatus, with a preferably cylindrical lamp chamber A, and a hinged door D, preferably formed flat on its outer surface and curved on its inner one, as shown in Fig. 10ᵃ. The outer flat sliding door D³ carries a straight rack D⁴ which will engage and operate a gear wheel or pinion R⁷ carrying the sweep S.

Figs. 11 and 12 show a segmental cup shaped sweep S, preferably inclosing about half the lamp or vessel, and the lamp chamber A is provided with a rigid post U for the sweep to butt against when the apparatus is closed, and thus tend to crush any obstructions or tampering articles removed by the moving sweep from around or about the lamp. The arrangement of this mechanism will be understood from the illustrations. The bar T which operates the sweep S and guard plate J is formed threaded as shown, and a sleeve J⁵ mounted on the threaded portion carries a push operating device F², one end of which projects into a push slide G¹¹, and as the bar T revolves the push piece G will finally pass through aperture L and make contact with a lamp in the chamber A. To steady the lamp while undergoing the sweeping operation, I may arrange in the sweep crown or guard plate a spring pressed plunger which would bear hard upon the dome of the lamp and so keep same in position. The plunger would be provided with a ball end so as not to interfere with the rotation of the desired parts.

It will be understood by those skilled in the art that other forms of sweeps and means for operating them may be resorted to without in any way departing from the principle of my improvement, for instance, a lamp may be revolved in one direction and the sweep in the contrary one, or the sweep may be attached to a separate series of levers and cords or the like, operated either by hand or by the operation of the apparatus.

What I claim as my invention is:—

1. An apparatus for igniting miners' safety lamps comprising a lamp chamber, means for closing the same, and a sweep operated by the closing means to remove any obstructions within the chamber.

2. An apparatus for igniting miners' safety lamps, comprising a lamp chamber, a sweep operating therein, a door, and means operated by the closing of the door for actuating the sweep and igniting the lamp.

3. An apparatus for igniting miners' safety lamps, comprising a lamp chamber consisting of relatively movable parts, a sweep in said chamber, and means actuated by the movable part of the chamber for actuating the sweep and lighting the lamp.

4. An apparatus for igniting miners' safety lamps comprising a chamber consisting of relatively movable parts, a sweep, means actuated by the closing movement of the movable portion of the chamber for actuating the sweep, and means actuated by said closing movement for completing an electric circuit to light the lamp.

In witness whereof, I have hereunto set my hand, in the presence of two witnesses.

ERNEST ARTHUR HAILWOOD.

Witnesses:
  WILLIAM MOSS TELFORD,
  SAM WHETTALL.